United States Patent [19]

Mikado

[11] Patent Number: 4,654,711
[45] Date of Patent: Mar. 31, 1987

[54] TELEVISION GENERATOR FOR HIGHLIGHTING PORTIONS OF AN IMAGE

[75] Inventor: Tsuneo Mikado, Tokyo, Japan

[73] Assignee: Nippon Television Industry Corporation, Tokyo, Japan

[21] Appl. No.: 772,866

[22] Filed: Sep. 5, 1985

[30] Foreign Application Priority Data

Sep. 13, 1984 [JP] Japan .................................. 59-192092

[51] Int. Cl.$^4$ ........................ H04N 3/223; H04N 5/14; H04N 9/64
[52] U.S. Cl. .................................... 358/180; 358/160; 358/21 R; 358/22
[58] Field of Search ............... 358/160, 22, 21 R, 180, 358/182, 183, 185, 133; 340/728

[56] References Cited

U.S. PATENT DOCUMENTS

| | | | |
|---|---|---|---|
| 4,163,249 | 7/1979 | Michael et al. | 358/180 |
| 4,204,227 | 5/1980 | Gurley | 358/133 |
| 4,409,618 | 10/1983 | Inaba et al. | 358/183 |
| 4,496,974 | 1/1985 | Heitmann | 358/180 |
| 4,578,812 | 3/1986 | Yui | 358/180 |

Primary Examiner—James J. Groody
Assistant Examiner—Cynthia Smith
Attorney, Agent, or Firm—Parmelee, Bollinger & Bramblett

[57] ABSTRACT

A contour map signal generator is provided for generating television signal. The contour map signal generator consists of n-series connected circuit, each generating signals for a first pattern and second pattern enlarged or reduced from the first and outputting by arithmetic addition contour map data representative of a step region consisting of two patterns. n-step contour map data generated through the n-series circuit is stored in an image memory and read out to be fed back to the input of said contour map signal generator. n x N-step contour map is generated through N times feedback operations. The contour map data is used for generating a television signal representative of a picture effect in which the original pattern area is enlarged or reduced as the time elapses for highlighting the original pattern.

13 Claims, 8 Drawing Figures

TELEVISION GENERATOR FOR HIGHLIGHTING PORTIONS OF AN IMAGE

BACKGROUND OF THE INVENTION

1. Field of the Invention

The present invention relates to a television signal generator for highlighting a portion inside or a portion around a pattern image such as a character, numeral or symbol.

2. Description of the Prior Art

In order to highlight a portion around a pattern image such as a character, numeral or symbol, a manual operation of writing a highlighting pattern on the original film has been conventionally required.

It is an object of the present invention to provide a circuit means for electrically highlighting a portion around a pattern image.

A circuit is proposed in U.S. Ser. No. 622,134 by the same inventor as a simple means for electrically highlighting a portion around a pattern image. This circuit slightly delays an original pattern signal in the horizontal and vertical directions to obtain a plurality of delayed signals. A pattern of a larger area than the original pattern image is obtained by logically ORing the delayed signals. This process is repeated so as to form a profile pattern to surround the original pattern image. The brightness of the profile pattern is instantaneously decreased/increased to highlight it.

However, when highlighting is performed over the entire surface of the screen with such a circuit means, hardware becomes large in size, resulting in an impractical circuit.

It may be proposed to enlarge a graphic pattern by numeral operation using an image memory and a computer and to highlight it by increasing the brightness of the enlarged portion. However, in order to form a highlight pattern which is enlarged first and then reduced as time elapses, a very large number of operation steps is required, and processing cannot be performed in a short period of time substantially corresponding to real time.

SUMMARY OF THE INVENTION

As described above, according to the prior art, hardware is increased in volume and high-speed operation cannot be performed. It is an object of the present invention to provide a highlight generator which has a simple configuration and can perform high-speed operation.

A television signal generator according to the present invention has a contour map generator consisting of n-series connected circuits each for generating, in accordance with input video data, two types of video data respectively representing a predetermined region on a screen represented by the input video data and a region obtained by enlarging or reducing a region of a predetermined width around the predetermined region, and arithmetically adding the video data so as to obtain video data having step region data with respect to brightness.

The n-step region map data output from the region map generator is stored in an image memory. A readout output from the image memory is fed back to an input of a data region map generator, and n×N step region map data are stored in the image memory by N feedback operations.

The television signal generator of the present invention further has a data converter for obtaining video data to provide a video effect in which a portion surrounding a region on the screen represented by original video data is enlarged or reduced as time elapses in accordance with the region map data and time data.

With this arrangement, high-speed operation can be performed with a small volume of hardware so as to perform required video processing within a short period of time.

The above and other objects, features and advantages of this invention, will be apparent from the following detailed description of illustrative embodiments which are to be read in connection with the accompanying drawings.

DETAILED DESCRIPTION OF THE PREFERRED EMBODIMENTS

Figure 1:
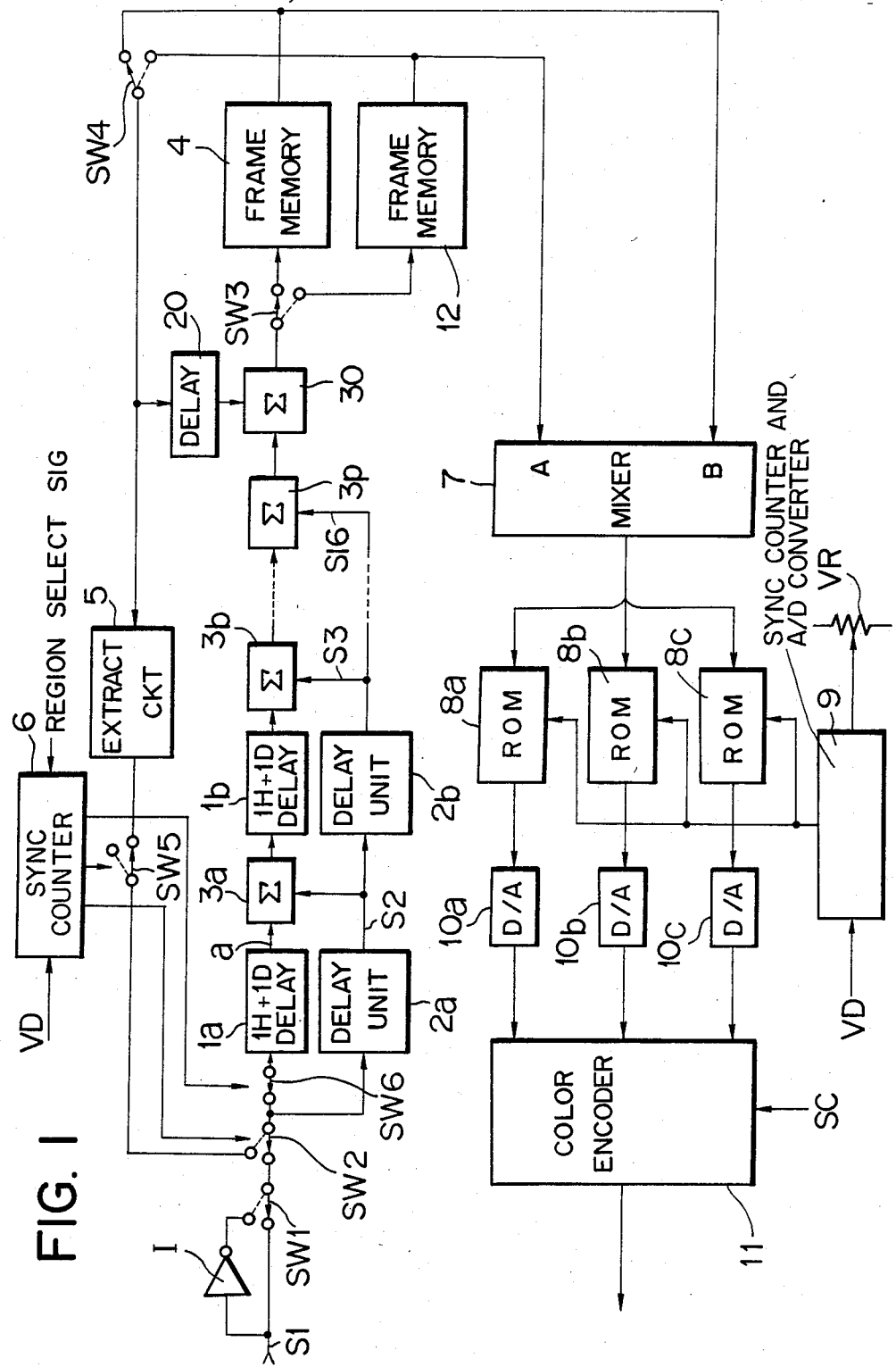
FIG. 1 is a block diagram showing a television signal generator according to an embodiment of the present invention.

Referring to FIG. 1, a bit image digital pattern signal S1 is written in a frame memory 4 through plural stages of delay circuits each consisting of a 1H+1D delay element 1a, a delay unit 2a and an adder 3a via switches SW1 and SW2. The input pattern signal S1 is an original signal around which a highlight portion is to be displayed and is, for example, a video signal in which one picture element or pixel is represented by 1 bit.

Figure 2:
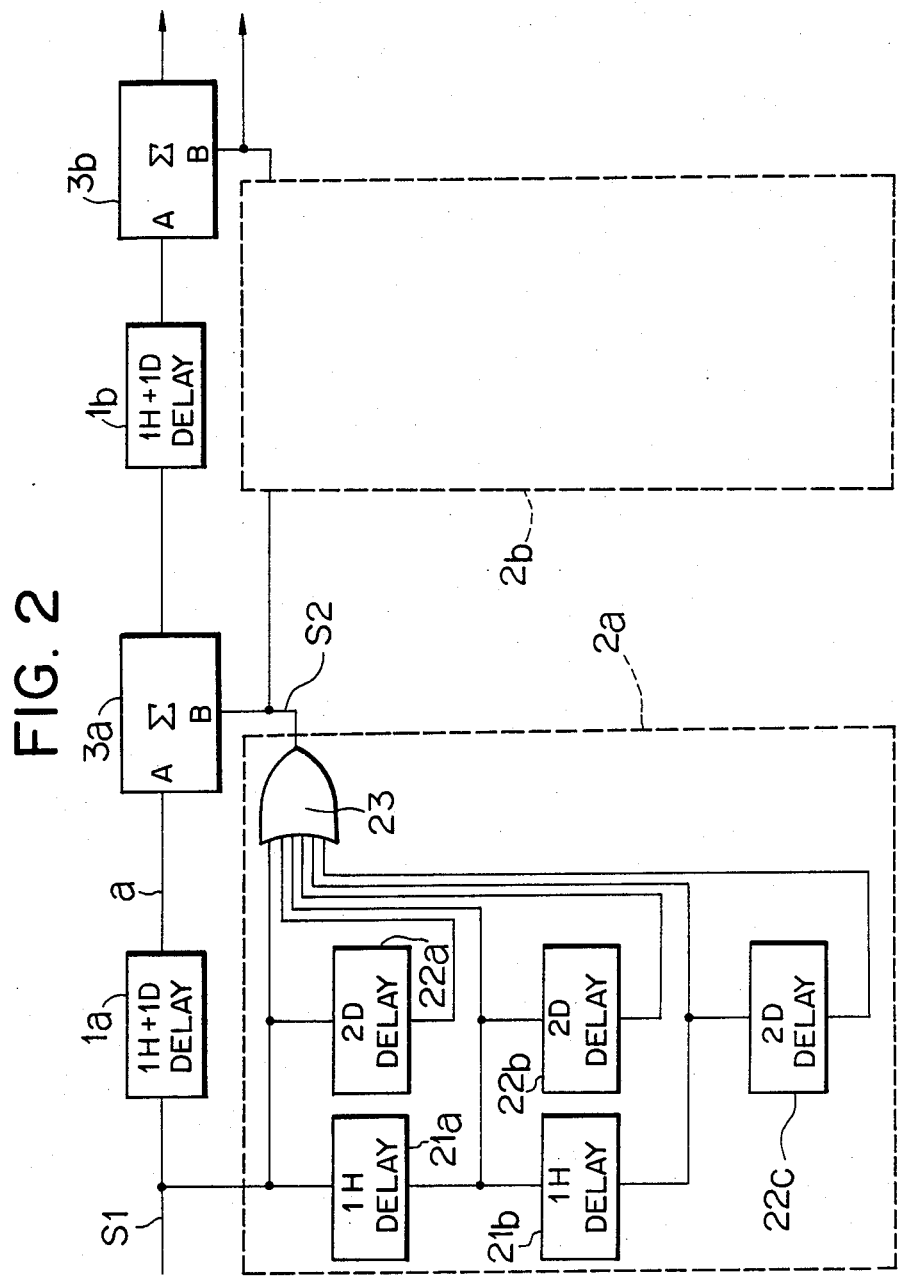
FIG. 2 is a circuit diagram showing details of a delay unit shown in FIG. 1.
Figure 3:
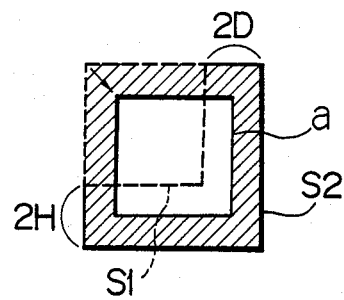
FIG. 3 is a diagram showing an image pattern for explaining a region enlargement effect of an image by the circuit shown in FIG. 2.

As shown in FIG. 2, the delay unit of each delay circuit delays by 1H (H: 1 horizontal period) the input pattern signal S1 by 1H delay elements 21a and 21b. The input signal S1 and outputs from the respective delay elements 21a and 21b are delayed by 2D (D: delay time corresponding to the horizontal distance on the screen corresponding to an interval between adjacent horizontal lines on the screen) by 2D delay elements 22a to 22c. Outputs from the respective 2D delay elements 22a to 22c and the original input signal S1 are added by logical OR through an OR gate 23 to obtain an enlarged pattern S2. The area of the original pattern S1 (dotted line) is enlarged by 2D horizontally and 2H vertically, that is, by two picture elements, respectively in width as shown in FIG. 3.

The pattern signal S2 output from the OR gate 23 is supplied to the adder 3a and is digitally added to an output a from the 1H+1D delay element 1a. The output a from the 1H+1D delay element 1a is a signal obtained by delaying the original pattern S1 (dotted line) obliquely by one picture element, as shown in FIG. 3, and is located at the center of the enlarged pattern S2. In other words, the pattern S1 is obtained by enlarging the four profile sides of the pattern a corresponding to the original by 1 bit each.

Figure 4:
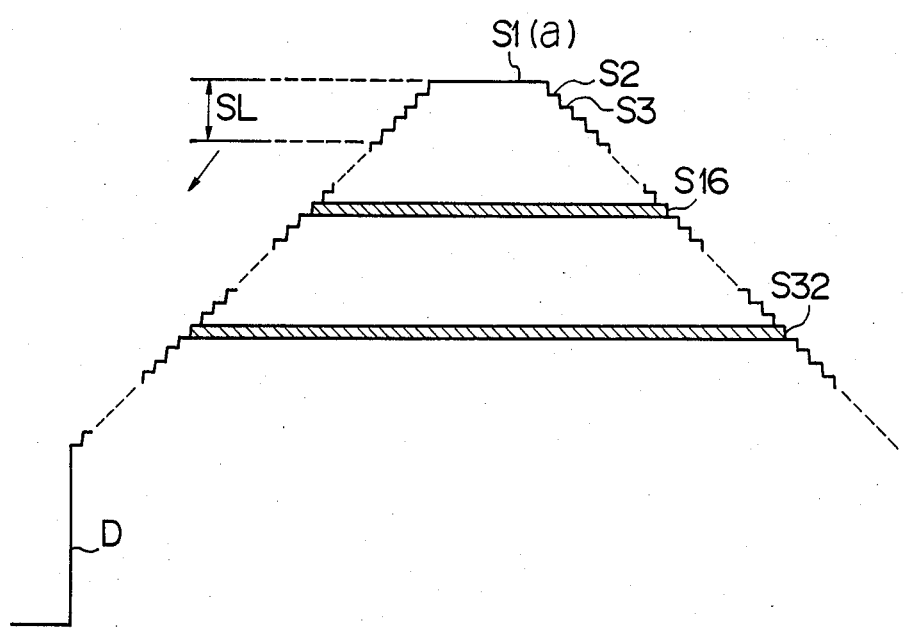
FIG. 4 is a diagram showing an enlarged step map stored in the frame memory shown in FIG. 1.

The adder 3a is a 4-bit adder, a portion a(S1) shown in FIG. 4 is (0010), and a portion S2 therein is (0001). In this manner, the pattern S2 having discriminate step data is formed around the pattern a(S1).

An output from the adder 3a is supplied to the delay circuit of the next stage and is processed by a 1H+1D delay element 1b, a delay unit 2b and an adder 3b in a similar manner to that described above. Thus, as shown in FIG. 4, a portion S3 having a width of one pixel and a 1-bit step difference is added around the pattern S2. At this time, a portion S3 is (0001), a portion S2 is (0010), and a portion S1 is (0011).

Repeating the above generates a pattern data of a contour map with enlarged in area and step added (16 levels) to the original through 16 delay circuits. An output from the final stage is written in the frame memory 4 through an adder 30 and a switch SW3. The memory 4 is a pixel memory in which each pixel is represented by 8 bits data.

The written data in the frame memory 4 is read out and is supplied to an extractor 5 through a switch SW4. The extractor 5 extracts a bit image signal corresponding to the most enlarged area which is the bottom pattern S16 as shown by hatched region in FIG. 4. The extractor 5 may comprise a circuit which calculates a logical OR product of the respective bits of each readout pixel data (8 bits) and produces a 1-bit output "1" to each pixel. Pixel data representing the entire region of the pattern S16 is supplied to the 16 delay circuits again through switches SW5 and SW2.

The switches SW2 and SW5 are controlled by a sync counter 6. The sync counter 6 counts vertical sync signals VD and switches the switch SW2 from an input contact to a feedback contact after 2V (1 frame, V: the vertical scanning period) elapses so as to form a feedback circuit (loop). After a 15 frame period has elapsed, the sync counter 6 generates a switch control signal to turn off the switch SW5 and to cut off the loop.

When output data from the frame memory 4 is fed back through the 16 delay circuits, contour map data having 16 step data added further to the pattern S16 is obtained. This map data is added to the readout data from the frame memory 4 by the adder 30. The output from the frame memory 4 is delayed by (1H+1D)×16, i.e., 16H+16D by a delay circuit 20 for centering the first generated contour map. The second data having enlarged step data S17 to S32 added to the first map of S1 to S16 is obtained from the output from the adder 30. This data is written in the frame memory 4 again.

The readout output from the frame memory 4 is fed back to the group of delay circuits through the extractor 5 in the same manner described above. The signal is circulated 15 times through the loop and the region is enlarged to 256 steps.

In the process of each feedback loop circulation, except for the first signal passing through the delay circuit group, a switch SW6 coupled to the input of the first 1H+1D delay element 1a is opened by control operation of the sync counter 6, so that the 16th step pattern already stored in the frame memory 4 will not be generated in duplicate.

In this manner, a 256-step contour map is generated. Depending upon the location of the original pattern on the screen, the outer periphery of the map may reach the outer edge of the frame memory 4 corresponding to an edge of the TV screen before the enlarged region reaches 256 steps. In this case, since there is no more storage location (memory cell), region enlargement is discontinued, and the level of each pixel inside the edge is increased only as indicated by D in FIG. 4.

Region enlargement of 256 steps corresponds to enlargement to substantially the entire TV screen area. As shown in FIG. 3, enlargement is performed in four directions of up-down (vertical) and right-left (horizontal) directions. Assuming that about 500×500 picture elements can be displayed on the TV screen, even if an input pattern is a minimum point pattern consisting of one pixel, a step pattern map of an area covering substantially the entire screen can be obtained by a 256-step region enlargement. However, normally, the input pattern S1 is a character image or a graphic image consisting of several hundred picture elements.

With the arrangement shown in FIG. 1, generation of a 256-step enlarged pattern requires only about 16 frames (about 0.5 sec). Therefore, substantially real time processing can be performed without wait time.

The size of enlarged regions to be highlighted can be limited by supplying a region select signal to the sync counter 6 so that the signal is circulated through the loop for only a limited number of frames. For example, when the switch SW5 is controlled to be turned off after 4-frame period has elapsed, generation of the contour pattern map is interrupted at 64 steps. Still faster image processing can be performed if an area of a region to be highlighted is limited in this manner.

The enlarged step pattern generated in this manner is continuously read out from the frame memory 4 as a still image, and supplied to the address input terminals of ROMs 8a, 8b and 8c through a mixer 7. The ROMs 8a, 8b and 8c are data converters for generating dynamic highlight pattern data which changes over time in accordance with still (static) step pattern data shown in FIG. 4 from the frame memory 4. Conversion tables are written in these ROMs 8a, 8b and 8c so as to obtain a predetermined highlight image.

The ROM 8a is a luminance data converter, the ROM 8b is a hue data converter, and the ROM 8c is a saturation data converter. Signals for changing the respective ROM outputs over time are generated by a sync counter and A/D converter 9 for counting the vertical sync signals VD and are supplied to the other address input terminals of each of the ROMs 8a to 8c. The sync counter and A/D converter 9 may comprise a reversible VD counter which generates time address signal.

For example, when the step map in the frame memory 4 consists of 5 step patterns S1 to S5, the ROM 8a generates an output as shown in Table 1 below as time elapses (t0, t1, ...).

TABLE 1

| Input | t0 | t1 | t2 | t3 | t4 | t5 | t6 | t7 | t8 | t9 | t10 | t11 | t12 | t13 | t14 | ... |
|---|---|---|---|---|---|---|---|---|---|---|---|---|---|---|---|---|
| S1 | M | M | M | M | M | M | M | M | M | M | M | M | M | M | M | |
| S2 | 0 | 1 | 2 | 3 | 4 | 4 | 4 | 4 | 4 | 4 | 4 | 3 | 2 | 1 | 0 | |
| S3 | 0 | 0 | 1 | 2 | 3 | 4 | 4 | 4 | 4 | 4 | 3 | 2 | 1 | 0 | 0 | |
| S4 | 0 | 0 | 0 | 1 | 2 | 3 | 4 | 4 | 4 | 3 | 2 | 1 | 0 | 0 | 0 | |

TABLE 1-continued

| Input | t0 | t1 | t2 | t3 | t4 | t5 | t6 | t7 | t8 | t9 | t10 | t11 | t12 | t13 | t14 | ... |
|---|---|---|---|---|---|---|---|---|---|---|---|---|---|---|---|---|
| S5 | 0 | 0 | 0 | 0 | 1 | 2 | 3 | 4 | 3 | 2 | 1 | 0 | 0 | 0 | 0 | |

Referring to Table 1, at time t0, a predetermined brightness level M is provided in a region S1 corresponding to the original input pattern. At time t1, a brightness level 1 is provided for a portion S2 surrounding the pattern S1. At time t2, the brightness level 1 is provided in a portion S3 surrounding the pattern S1, and a higher brightness level 2 is provided in the portion S2. Likewise, regions of higher brightness are gradually enlarged around the pattern S1. At time t7, the overall outer region including the outermost pattern S5 reaches the maximum brightness level 4. Thereafter, the brightness and area of bright regions are gradually decreased, and the original state is obtained at time t14.

It should be noted that ROM 8a receives a series of 8-bit step data corresponding to a train of pixels read out of the memory 4 along respective horizontal lines. The ROM 8a converts the step data to brightness data prestored as the Table 1. The conversion from S1, S2, . . . to one of columns of Table 1 is addressable by the time address t0, t1, t2, . . .

Such brightness and region area changes over the time base are performed within a short period of time (e.g., 1 sec) so as to highlight a portion around the region S1 corresponding to the original pattern. Additionally, the brightness level inside the region S1 corresponding to the original input pattern can be increased or decreased over time.

The ROM 8b generates, as time elapses, data for coloring the region S1 of the original pattern and the highlight portions S2 to S5 in accordance with a predetermined data conversion table as in the case of Table 1. For example, data is generated to display the highlight portion in red or to display the highlight portion in light blue with the original pattern portion S1 in red. In addition, a saturation effect which changes over time can be obtained. For example, the highlight portion is dark red first, gradually changes to pale blue as the brightness level and highlight region area increases, and then returns to the original dark red as the highlight region is reduced in area. Furthermore, a hue change in proportion as the pattern enlarges may be obtained such that the central portion of a highlight region is displayed in yellow and the surrounding portion displayed is gradually changed to red via orange.

The ROM 8c converts the static pattern map data to saturation data which changes over time in coordination with the brightness and hue effects obtained with the ROMs 8a and 8b. A conversion table is written in the ROM 8c as shown in Table 1. For example, for a red highlight portion, a portion closer to the original pattern S1 can be displayed in darker red, and a portion further from the pattern S1 can be displayed in lighter red, or vice versa.

Outputs from the ROMs 8a to 8c are converted by D/A converters 10a to 10c into analog signals which are supplied to a color encoder 11. In response to a subcarrier sc, the color encoder 11 performs color modulation of the input signals in accordance with hue and saturation data so as to obtain chroma signals. The chroma signals are added to brightness data to obtain a color video signal. The color video signal output is supplied to a video mixer (not shown), so as to be mixed with a video signal for broadcast.

Data which changes over time and supplied to the address input terminals of the ROMs 8a to 8c can be generated in accordance with the position (variable resistance) of a variable resistor VR interlocked with a manually operated control lever or a control volume. In this case, a voltage or current generated at the slider of the variable resistor VR is A/D converted in the sync and A/D converter 9, and the conversion data is supplied to the address input terminals of the ROMs 8a to 8c instead of the time address. Then, input/output conversion corresponding to Table 1 is performed in synchronism with the operation speed of the control lever or volume. In this manner, a highlight pattern which diverges or converges at a speed and area selected by a manual operation can be generated.

The above description has been made with reference to a case wherein a highlight portion is displayed around a predetermined pattern. However, a highlight portion can be displayed inside such a predetermined pattern. In this modification, the switch SW1 is operated such that the input pattern S1 is supplied to the delay circuits through an inverter I, referring to FIG. 1.

Figure 5:
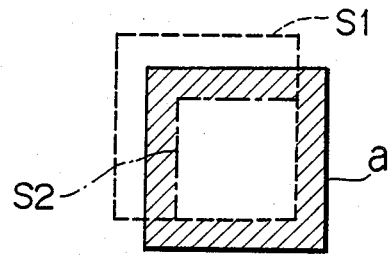
FIG. 5 is a diagram showing an image pattern when a step map is generated inside an original pattern image.
Figure 6:
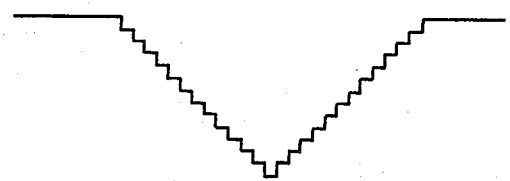
FIG. 6 is a diagram showing a step map obtained in the case of FIG. 5.

The inverter I generates an inverted pattern signal (complementary region signal) obtained by inverting pixel bits of an input pattern signal S1. When the inverted pattern signal is passed through the delay circuit stages, a 16-step pattern is formed inside a pattern a indicated by a solid line corresponding to the original input pattern, as shown in FIGS. 5 and 6. This pattern signal is written in a second frame memory 12 through the adder 30 and the switch SW3 operated in synchronism with the switch SW1. Data read out from the frame memory 12 is circulated through the feedback loop via the switch SW4, the extractor 5 and the switches SW5 and SW2, and a 256-step contour map is finally formed inside a region corresponding to the input pattern in a manner similar to that described above.

The readout output from the frame memory 12 is mixed with the data of the outer pattern map by the mixer 7, and the mixed data is supplied to the ROMs 8a to 8c. Data processing similar to that described above is performed and a highlight portion is displayed inside a region corresponding to the input pattern. The inner highlight portion alone can be selectively generated by switching two inputs A and B of the mixer 7.

Although the description has been made with reference to a case wherein a highlight portion is generated, a ripple pattern image enlarged outward from a region corresponding to an input pattern can be similarly obtained with the same circuit configuration. In this case, conversion tables to be stored in the ROMs 8a to 8c are modified, so that input/output changes as shown in Table 2, for example, are obtained.

TABLE 2

| Input | t0 | t1 | t2 | t3 | t4 | t5 ... |
|---|---|---|---|---|---|---|
| S7 | 0 | 0 | 1 | 2 | 3 | 2 |
| S8 | 1 | 0 | 0 | 1 | 2 | 3 |
| S9 | 2 | 1 | 0 | 0 | 1 | 2 |
| S10 | 3 | 2 | 1 | 0 | 0 | 1 |
| S11 | 2 | 3 | 2 | 1 | 0 | 0 |

TABLE 2-continued

| Input | t0 | t1 | t2 | t3 | t4 | t5 ... |
|---|---|---|---|---|---|---|
| S12 | 1 | 2 | 3 | 2 | 1 | 0 |
| S13 | 0 | 1 | 2 | 3 | 2 | 1 |
| S14 | 0 | 0 | 1 | 2 | 3 | 2 |
| . |
| . |
| . |

As shown in Table 2, at time t0, an annular surrounding pattern having a maximum brightness at a pattern S10 outside a region corresponding to the input pattern is generated. As time elapses, this surrounding pattern is gradually enlarged outward in the order of S11, S12, S13 and so on. Meanwhile, as time elapses, a new annular pattern is generated inside the surrounding pattern, and the inner annular pattern is also gradually enlarged. When such a multi-ripple pattern reaches the outer edge of the screen, the ripple pattern is reduced and returns to the original pattern image. Such a ripple effect can be obtained by modifying data stored in the ROMs 8a to 8c.

Figure 7:
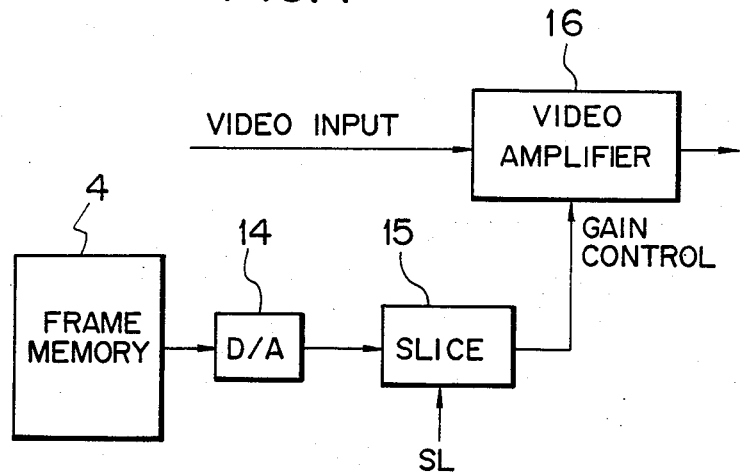
FIG. 7 is a circuit diagram showing a modification of processing of obtained step map data.
Figure 8:
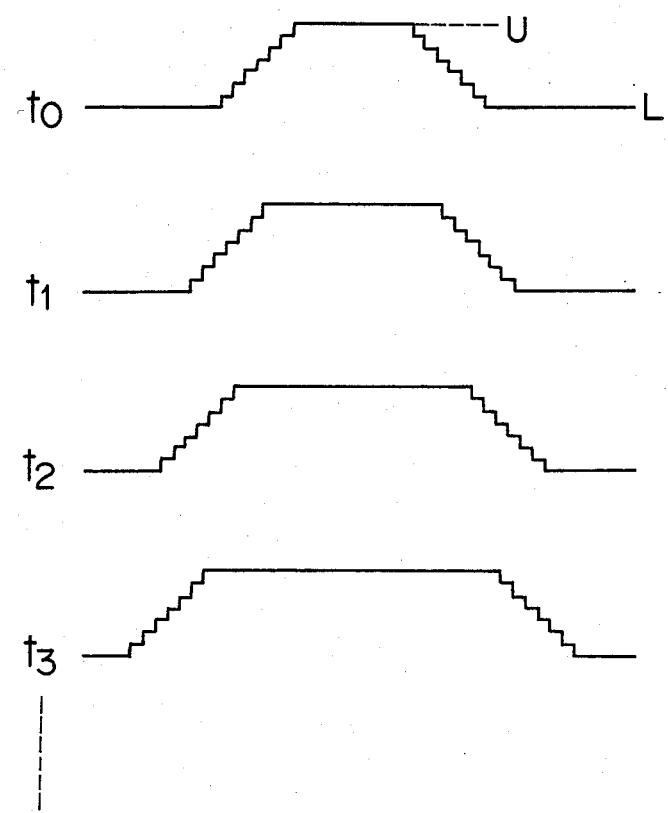
FIG. 8 shows timing charts of a slice signal obtained by the circuit shown in FIG. 7.

In the above embodiment, the steps of the pattern map stored in the frame memory 4 or 12 are added so as to write the pattern regions S1, S2, . . . , S256 distinctively with 1-bit differences in the memory as a contour map. Thus, the steps are not directly used as luminance data for generating a highlight portion. However, the map in FIG. 4 written in the frame memory 4 can be D/A converted to obtain analog step signals, and a highlight portion can be generated around the original pattern in accordance with the analog gray level signals. More specifically, the output from the frame memory 4 is converted into analog step signals which are supplied to a slicer 15, as shown in FIG. 7. The slicer 15 slices the input signals at a slice width SL shown in FIG. 4 so as to obtain a trapezoidal slice signal as shown at t0 in FIG. 8. The slice signal is supplied to the gain control input terminal of a video amplifier 16 so that the brightness level of a screen region corresponding to the upper slice level U roughly corresponds to the white peak. When the upper and lower slice levels of the slice width of the slicer 15 are gradually lowered, gradually highered and then returned to the original levels as time elapses, a slice signal for gradually enlarging and then reducing a white level region is obtained as shown in t1, t2, t3, . . . in FIG. 8. A highlight portion can be displayed when the gain of the input video signal is controlled in accordance with the slice signal obtained in this manner.

Effect of the Invention

According to the present invention, step map data obtained by enlarging an original pattern can be obtained within a short period of time with a simple circuit configuration, without requiring a large volume of hardware and lengthy operation of a computer. A highlight portion can be displayed around an original pattern or other video effects can be obtained in accordance with the enlarged map data.

What is claimed is:

1. A television signal generator comprising:
   a contour map signal generator consisting of n-series connected circuit, each comprising circuit means for generating video data representing a first picture pattern on a screen corresponding to an input video signal thereto, circuit means for generating video data representing a second picture pattern enlarged or reduced from said first pattern and an adder for arithmetically adding the two video data for the first and the second patterns to generate contour map data representing a step region consisting of said first and the second patterns;
   an image memory for storing n-step contour map data generated through said n-series connected contour map signal generator;
   a feedback circuit for feeding back a read output from said image memory to an input of said contour map signal generator so as to cause said image memory to store n×N-step contour map data through N times feedback operations; and
   a data converter for generating a video signal in accordance with the contour map data and time data to provide a picture effect such that the picture pattern on the screen corresponding to the original input video signal enlarges or reduces as time elapses.

2. A television signal generator according to claim 1, wherein said feedback circuit comprises an extracting circuit for extracting the most bottom region in the contour map data read out of said image memory and feeding the extracted data to the input of the contour map signal generator.

3. A television signal generator according to claim 2, wherein said feedback circuit further comprises:
   delay means for shifting a pattern corresponding to said readout data from the image memory by a fixed time delay to the center of a pattern on the screen corresponding to the output of said contour map signal generator; and
   an adder for arithmetically adding the outputs of said delay means and said contour map data generator.

4. A television signal generator according to claim 1, wherein said feedback circuit includes a control circuit for controlling the number N of the feedback operations.

5. A television signal generator according to claim 1, wherein said contour map signal generator comprises:
   delay means for generating plurality of delayed signals delayed horizontally and vertically on the screen in response to the input video signal;
   logical OR means for adding the delayed signals by logical OR to generate said video data for the second enlarged or reduced pattern; and
   delay means for delaying said input video signal to make the first pattern shift to the center of said second enlarged or reduced pattern.

6. A television signal generator according to claim 1, further comprising an inverter for supplying a video signal for a complementary pattern to the pattern on the screen corresponding to the input video signal to said contour map signal generator, and
   a second image memory for storing contour map data for said complementary pattern,
   said contour map data in the second image memory representing a pattern inwardly reducing from the original input pattern while said contour map data in the first image memory representing a pattern outwardly expanding from the original pattern.

7. A television signal generator according to claim 1, wherein said data converter comprises means for converting said contour map data to a luminance signal representative of a picture effect of enlargement or reduction of the pattern on the screen.

8. A television signal generator according to claim 7, wherein said data converter comprises means for converting said contour map data to chromatic data to be added to said luminance data.

9. A television signal generator according to claim 1, wherein said data converter comprises means for inputting time data to control enlargement or reduction of the pattern on the screen as time elapses.

10. A television signal generator according to claim 1, wherein said data converter comprises a ROM circuit for outputting prestored video data in response to address input consisting of said contour map data and time data for controlling time variation of said output video data representative of enlargement or reduction of the pattern on the screen.

11. A television signal generator according to claim 10, wherein said ROM circuit comprises a ROM for generating luminance data and a ROM for generating chromatic data.

12. A television signal generator according to claim 11, wherein said ROM for generating chromatic data comprising a ROM for hue and a ROM for color saturation.

13. A television signal generator according to claim 1, wherein said data converter comprises means for generating a video signal representative of a ripple pattern image consisting of alternate high-brightness and low-brightness encircling patterns which move outward or inward the original pattern as the time elapses.

* * * * *